Jan. 11, 1938.  N. G. MAXON  2,105,154

SPRAY NOZZLE

Filed June 7, 1937

Inventor

Norman G. Maxon.

By Clarence A. O'Brien

Hyman Berman

Attorneys

Patented Jan. 11, 1938

2,105,154

UNITED STATES PATENT OFFICE 2,105,154

SPRAY NOZZLE

Norman G. Maxon, Ladysmith, Wis.

Application June 7, 1937, Serial No. 146,915

2 Claims. (Cl. 299—107)

This invention relates to a spray nozzle, the general object of the invention being to provide a simple, but effective spray nozzle which will cause the water to leave the nozzle in a conical spray, so that the nozzle can be used on a hose for spraying purposes and for extinguishing fires.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
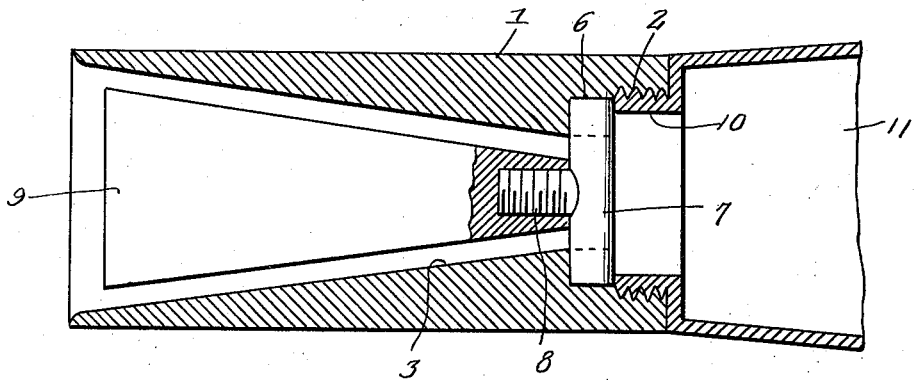
Figure 1 is a longitudinal sectional view, showing the improved nozzle attached to a fire hose nozzle.
Figure 2:
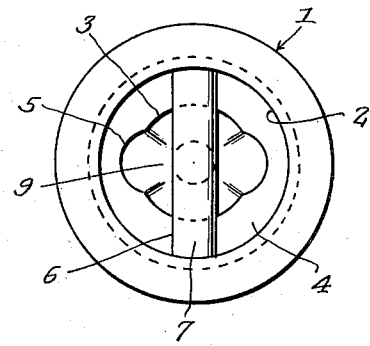
Figure 2 is a view looking into the inlet end of the improved nozzle.
Figure 3:
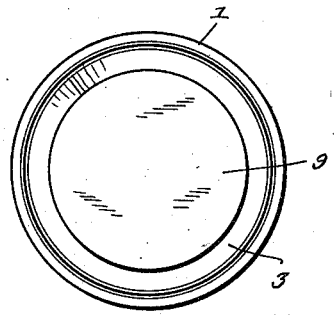
Figure 3 is a view looking at the outlet end thereof.

In this drawing, the numeral 1 indicates a cylindrical member having a threaded socket 2 in its inlet end and a tapered bore 3 extends from the inner end of the socket through the outlet end of the member, the small end of the bore being centrally arranged with respect to the socket and of much smaller diameter than the socket, so that an annular ledge or shoulder 4 is formed by the inner end of the socket. At diametrically opposite points, the inner edge of this shoulder or ledge is cut away to provide the recesses 5 which extend through portions of the wall of the bore or passage 3. Diametrically arranged notches 6 are formed in the shoulder or ledge for receiving the ends of the bar 7, which extends across the small end of the tapered bore, and said bar has a threaded stud 8 extending from its central portion for fitting in a threaded hole in the small end of a tapered member 9 which is located in the tapered bore or passage 3. This member 9 is so formed as to leave a space between itself and the walls of the bore, and this space provides a passageway for the water.

The threaded, reduced end 10 of a hose nozzle 11 or the like is adapted to be threaded in the socket 2, and the reduced part 10 abuts the bar 7, so as to hold the same in the notches 6. This member 11 may be the nozzle of a fire hose and the member 9 may be of hollow construction to lighten the same.

Thus it will be seen that the water flowing from the member 11 will pass through the tapered passage formed by the member 9 and the walls of the bore 3, the passage being of annular shape in cross section, and thus a conical spray or stream is produced by the device.

The recesses 5 compensate for any check on the passage of the water into the passageway by the rod 7, and by making this rod of circular shape in cross section so that it can partly rotate in the notches 6, the member 9 will be self-adjusting and the flow of water through the passageway will hold the member 9 in a central position relative to the passageway.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A nozzle of the class described, comprising a member having a tapered bore, a tapered member located in the bore and forming a passageway between itself and the walls of the bore, a member extending transversely across the first member adjacent the inner end of the bore thereof and rotatably supported in said first member and the tapered member having its inner end connected with the central portion of the transverse member.

2. A nozzle of the class described, comprising an elongated member having a tapered bore and a socket at the small end of the bore, said socket being of greater diameter than the small end of the bore, a pair of oppositely arranged notches in the shoulder formed by the socket at its junction with the bore, a rod having its ends fitting in the notches, a threaded stud projecting from the central part of the rod, a tapered member located in the bore and having a threaded socket for receiving the stud, said member forming a passageway between itself and the walls of the bore, and a member threaded in the socket and holding the rod in the notches.

NORMAN G. MAXON.